United States Patent
Huo et al.

(10) Patent No.: US 7,756,317 B2
(45) Date of Patent: Jul. 13, 2010

(54) METHODS AND SYSTEMS FOR AUTOMATED DETECTION AND ANALYSIS OF LESION ON MAGNETIC RESONANCE IMAGES

(75) Inventors: Zhimin Huo, Pittsford, NY (US); Hui Wang, Pudong (CN); Xu Liu, Shanghai (CN)

(73) Assignee: Carestream Health, Inc., Rochester, NY (US)

(*) Notice: Subject to any disclaimer, the term of this patent is extended or adjusted under 35 U.S.C. 154(b) by 1112 days.

(21) Appl. No.: 11/412,286

(22) Filed: Apr. 27, 2006

(65) Prior Publication Data

US 2006/0245629 A1    Nov. 2, 2006

Related U.S. Application Data

(60) Provisional application No. 60/675,589, filed on Apr. 28, 2005.

(51) Int. Cl.
*G06K 9/00* (2006.01)
*A61B 5/00* (2006.01)

(52) U.S. Cl. ............... 382/132; 382/128; 382/131; 382/294; 382/224; 600/408; 600/411; 600/420; 600/427; 600/431; 702/189; 702/19

(58) Field of Classification Search ............... 382/128, 382/274, 28, 130, 131, 132, 133, 162, 168, 382/203, 209, 232, 224, 284, 294; 324/307, 324/309; 600/408, 407, 411, 425, 437, 443, 600/476, 477, 523
See application file for complete search history.

(56) References Cited

U.S. PATENT DOCUMENTS

| 5,491,627 | A  | * | 2/1996  | Zhang et al. ............. 600/408 |
| 6,112,112 | A  |   | 8/2000  | Gilhuijs et al. |
| 6,317,617 | B1 | * | 11/2001 | Gilhuijs et al. ........... 600/408 |
| 6,353,803 | B1 |   | 3/2002  | Degani |
| 6,577,752 | B2 | * | 6/2003  | Armato et al. ........... 382/131 |
| 6,785,410 | B2 | * | 8/2004  | Vining et al. ............ 382/128 |
| 7,260,249 | B2 | * | 8/2007  | Smith ..................... 382/128 |
| 7,466,848 | B2 | * | 12/2008 | Metaxas et al. .......... 382/128 |
| 2005/0074149 | A1 | * | 4/2005 | Niemeyer ................ 382/128 |
| 2006/0018548 | A1 | * | 1/2006 | Chen et al. ............. 382/190 |

OTHER PUBLICATIONS

Niemeyer et al ( Comparison of automatic time curve selection methods for breast MR CAD), Medical Imaging May 2006 pp. 785-790.*
Paul S. Tofts et al., Quantitative analysis of dynamic Gd-DTPA enhancement in breast tumors using a permeability model, Magn Reson Med 33, pp. 564-568, Nov. 18, 2005.

(Continued)

*Primary Examiner*—Wesley Tucker
*Assistant Examiner*—Nancy Bitar

(57) ABSTRACT

A method for detecting and analyzing candidate lesions in a magnetic resonance image of a breast. The method includes the steps of: accessing a plurality of temporal magnetic resonance images of the breast; identifying candidate lesions by performing a temporal pattern analysis of the plurality of images to produce temporal features based on an uptake phase and a washout phase; performing a morphological operation on the candidate lesions to produce morphological features; and classifying the candidate lesions using the morphological features and temporal features to produce classified candidate lesions.

15 Claims, 8 Drawing Sheets
(1 of 8 Drawing Sheet(s) Filed in Color)

OTHER PUBLICATIONS

S. C. Rankin, MRI of the breast, Br. J. Radiol 73, pp. 806-818, Aug. 2000.

Christopher J.C. Burges, A tutorial on support vector machines for pattern recognition, Data Mining and Knowledge Discovery, 2(2), pp. 1-47, 1998, Kluwer Academic Publisher, Boston.

Simon Haykin, Neural Networks: A comprehensive foundation, New York, Macmillan College Publishing Company, 1994, ISBN 0-02-352761-7.

Edward A. Sickles, Breast Imaging: From 1965 to the Present, Radiology, 2000, 215, pp. 1-16.

Susan G. Orel et al., MR Imaging of the Breast for the Detection, Diagnosis, and Staging of Breast Cancer, Radiology 2001, 220, pp. 13-30.

Gary P. Liney et al. Dynamic Contrast-Enhanced MRI in the Differentiation of Breast Tumors: User-Defined Versus Semi-automated Region-of-Interest Analysis, Journal of Magnetic Resonance Imaging, 1999, 10, pp. 945-949.

Christiane K. Kuhl et al., Dynamic Breast MR Imaging: Are Signal Intensity Time Course Data Useful for Differential Diagnosis of Enhancing Lesions?, Radiology 1999, 211, pp. 101-110.

Mitchell D. Schnall et al., A Combined Architectual and Kinetic Interpretation Model for Breast MR Images, Academic Radiology, 2001, 8, pp. 591-597.

Lesion Diagnosis Working Group, Lesion Diagnosis Working Group Report, Journal of Magnetic Resonance Imaging, 1999, 10, pp. 982-990.

M. V. Knopp et al., Pathophysiologic Basis of Contrast Enhancement in Breast Tumors, Journal of Magnetic Resonance Imaging, 1999, 10, pp. 260-266.

Laura Esserman et al., Contrast-Enhanced Magnetic Resonance Imaging to Assess Tumor Histopathology and Angiogenesis in Breast Carcinoma, The Breast Journal, 1999, 5, pp. 13-22.

* cited by examiner

CIRCULARITY

METHODS AND SYSTEMS FOR AUTOMATED DETECTION AND ANALYSIS OF LESION ON MAGNETIC RESONANCE IMAGES

CROSS REFERENCE TO RELATED APPLICATIONS

Reference is made to, and priority is claimed from, provisional application U.S. Ser. No. 60/675,589, entitled "METHODS AND SYSTEMS FOR AUTOMATED DETECTION AND ANALYSIS OF LESION ON MAGNETIC RESONANCE IMAGES", filed on Apr. 28, 2005, in the names of Huo et al, and assigned to the assignee of this application.

FIELD OF THE INVENTION

The present invention relates to digital image processing. More particularly, the invention is directed to a method for medical image analysis, such as to detect and diagnose breast cancer using contrast enhanced MRI images.

BACKGROUND OF THE INVENTION

Breast cancer is a common cancer of women and a common cause of cancer deaths. Mammography is an imaging modality which has provided some effectiveness in the early detection of clinically occult breast cancer, and is viewed by some to be a primary imaging modality for breast cancer screening.

However, mammography has been considered by some to have limitations in its ability to detect cancer, with one reported sensitivity being estimated at 80-85%. This limitation may result from the obscuration of the tumor by superimposed fibroglandular tissue. Limitations in sensitivity have stimulated the evaluation of adjunctive imaging modalities for breast cancer screening. MRI (Magnetic Resonance Imaging) is known, and breast MRI is one of these imaging tools.

One benefit of MRI is its delineation of soft tissue and its ability to image the breast in fine sections dynamically and in multiple planes thereby providing four-dimensional information. The basis of MR enhancement of breast cancer relates to vascularity of lesions and vessel permeability. Invasive breast cancer shows increased vascularity with an increased permeability of this neovascularity leading to an early uptake and early washout phenomenon. In addition, invasive breast cancers tend to have increased vascularity at the periphery leading to a rim-enhancing pattern of lesions. The pattern of enhancement of DCIS can be variable including both ductal and regional enhancement.

Advances have been made in the field of breast MRI, however, there is no well-defined standard or optimal imaging technique for performing contrast-enhanced breast MRI. In addition, there are no standardized interpretation criteria and no unified definition of what constitutes clinically important contrast enhancement. There have been several approaches to image interpretation: 1) evaluation of enhancement kinetics or patterns of contrast enhancement 2) evaluation of lesion morphology or appearance. Some researchers believe that malignant lesions consistently enhance and do so earlier and to a greater degree than benign lesions. Some researchers have utilized a quantitative approach to kinetic evaluation or enhancement patterns. Others have used a qualitative method for evaluation of the overall shape of the enhancement curve when attempting to distinguish benign from malignant lesions.

Referring to FIG. 1, there are shown three types of contrast enhancement patterns in terms of time/enhancement intensity curves. Type I shows a steady enhancement where a persistent increase in signal intensity is present after 2 minutes. Type II shows a plateau, where the maximum signal intensity is achieved in 2 minutes and remains constant. Type III shows a washout, where the maximum achieved signal is demonstrated by 2 minutes and decreases with time. Benign lesions are believed to demonstrate Type I curve and malignant lesions are believed to demonstrate Type III.

In breast MRI scans, a contrast agent injected into the bloodstream can provide information about blood supply to the breast tissues. Usually, several scans are taken, with one before the contrast agent is injected and at least one after the contrast agent is injected. The pre-contrast and post-contrast images are compared and areas of difference before and after injection are highlighted. It should be recognized that if the patient moves even slightly between the two scans, detail information in the images may be distorted, thus resulting a loss of information due to a misregistration of the two scans acquired at the different times. Image registration may be required to reduce artifacts due to patient movement.

A study of these contrast enhancement patterns enables the identification of three different tissue types due to their differential contrast uptake and washout properties as illustrated in FIG. 1. Typically, cancerous tissue shows a high and fast uptake due to a proliferation of "leaky" angiogenic microvessels, while normal and fatty tissues show little uptake. The uptake (dynamic) curves can be fitted using a pharmacokinetic model to give a physiologically relevant parameterisation of the curve (refer to P. S. Tofts, B. Berkowitz, M. Schnall, "Quantitative analysis of dynamic Gd-DTPA enhancement in breast tumours using a permeability model", Magn Reson Med 33, pp 564-568, 1995). U.S. Pat. No. 6,353,803 (Degani), U.S. Patent Application No U.S. 2006/0018548 (Chen) and U.S. Patent Application No U.S. 2005/0074149 (Niemeyer) applied techniques and pre-selected thresholds to differentiate Type I, II and III curves. U.S. Pat. No. 6,112,112 (Gilhuijs) performed variance processing on the temporally obtained image data to derive variance image data defining a variance image indicative of variation of voxels. Variance images were used to perform breast volume segmentation, breast border removal, lesion enhancement, determination of the bounding sphere, computation of a 3D search volume, suppression of surrounding structures, and volume growing, then determine an estimate of the extent of the tumor (lesion) in the breast. The limitation of the above approaches is that the interpretation based on temporal analysis of contrast enhancement only.

A study of these curves of time/enhancement parameters has been used clinically to identify and characterize tumors into malignant or benign classes, although the success has been variable with generally good sensitivity but often very poor specificity (for example, refer to S. C. Rankin "MRI of the breast", Br. J. Radiol 73, pp 806-818, 2000).

Lesion morphology such as architectural features identified on high spatial resolution images has been used to characterize lesions as to benign or malignant. Features that have been reported as suggestive of malignancy include a mass with irregular or spiculated borders and peripheral or ductal enhancement. Features of benignity include a mass with smooth or lobulated borders, no enhancement, nonenhancing internal septa and patchy parenchymal enhancement. In mammography, lesion margins represent the interface between the lesion and the adjacent parenchyma. The margin interface on MRI represents the interface between the area of vascularity and the surrounding tissue. It should be noted that the mammographic features will not necessarily be the same on a mammography and MRI image.

Applicants have noted that an integrated interpretation strategy where enhancement kinetics and morphologic features are used together would potentially obtain superior outcomes compared to the use of either method alone.

Accordingly, there exists a need for an approach to effectively combine temporal and spatial analysis of the 4D MRI images to automatically detect and diagnose breast lesions in dynamic MRI images. While U.S. Pat. No. 6,317,617 (Gilhuijs) extracts features from an identified lesion to characterize and diagnosis the lesion, the approach provides an analysis of a pre-identified suspicious area.

The present invention provides an automated detection and characterization of breast lesions in MRI images. The method identifies suspicious cancerous areas based on the analysis of time/enhancement properties of the tissues, and characterizes the suspicious areas using spatial and/or temporal features to determine the likelihood of malignancy.

SUMMARY OF THE INVENTION

An object of the invention is to provide a method and system for automated detection and characterization of cancerous areas in magnetic resonance (MR) images.

Another object of the invention is to provide an automated method and system for the detection of lesions using computer-extracted features from MR images of the breast, and for the characterization of the detected lesions.

A further object of this invention is to provide an automated method and system for determination of temporal features, spatial features, and/or hybrid features to assess the characteristics of the lesions in MR images.

An additional object of this invention is to provide an automated method and system for merging computer-extracted information from MR images and making a diagnosis and/or prognosis.

A further object of the invention is to provide an automated method and system for determining an estimate of the likelihood of malignancy or of prognosis of a lesion on an MR image.

Another object of the invention is to provide a method and system for presenting an enhanced visualization of breast cancer in MRI images.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

The present invention provides a method and system for automated detection and characterization of breast lesions on dynamic contrast-enhanced MRI images. The method analyzes time/contrast-enhancement properties of breast tissues on a series of 3D breast MRI images acquired before and after contrast injection. The breast tissue is classified into several categories with an associated likelihood of malignancy. The method determines breast regions considered to be suspicious for further analysis based on the analysis of temporal features extracted from time/contrast curves. Morphological features are extracted to characterize size, shape, margin of these identified areas, and temporal features are extracted to characterize the variation or non-uniformity in the contrast uptake and washout within each region. The morphological and temporal features can be merged to estimate a likelihood of malignancy for each identified region by a classifier. At least two types of color maps can be output. One map can provide multiple colors representing breast tissues assigned with different categories determined based on the time/enhancement curves. Another map can provide one color indicating suspicious cancerous areas.

According to one aspect of the present invention, there is provided a method for detecting and analyzing candidate lesions in a magnetic resonance image of a breast. The method includes the steps of: accessing a plurality of temporal magnetic resonance images of the breast; identifying candidate lesions by performing a temporal pattern analysis of the plurality of images to produce temporal features based on an uptake phase and a washout phase; performing a morphological operation on the candidate lesions to produce morphological features; and classifying the candidate lesions using the morphological features and temporal features to produce classified candidate lesions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
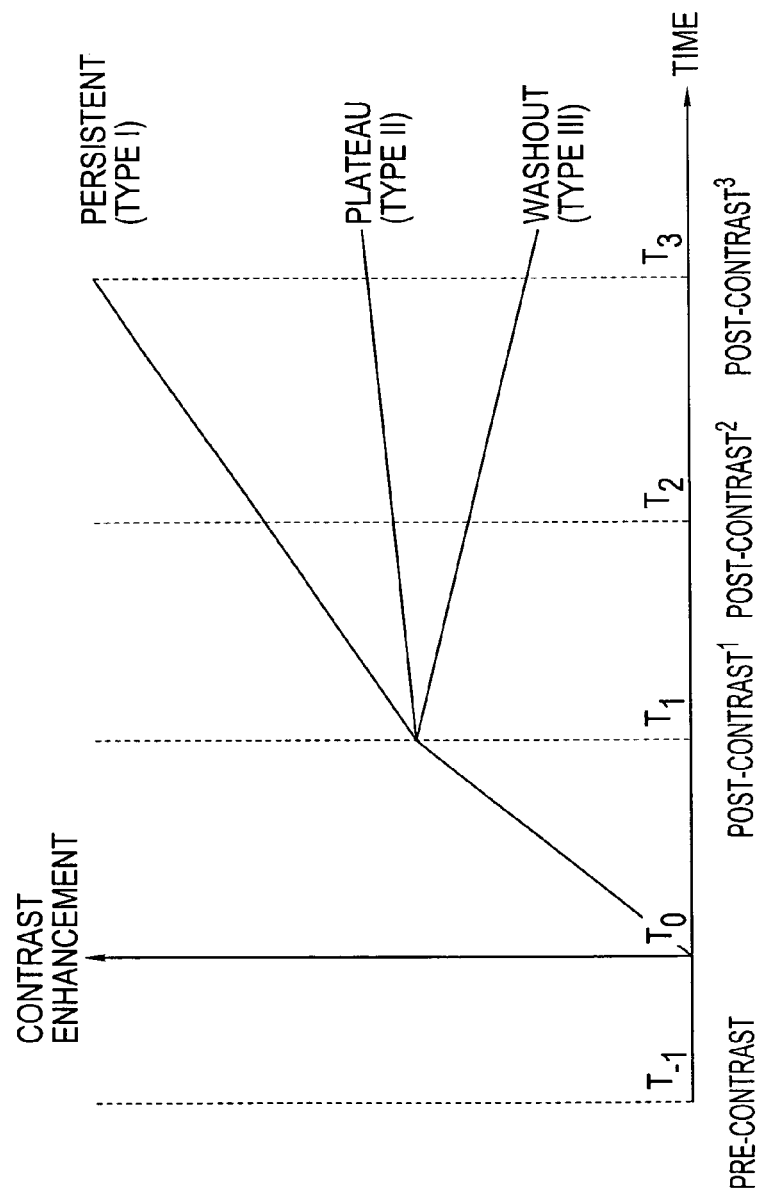
FIG. 1 is a graph illustrating three types of dynamic contrast uptake properties (curves) for different breast tissues.

The following is a detailed description of the preferred embodiments of the invention, reference being made to the drawings in which the same reference numerals identify the same elements of structure in each of the several figures.

Figure 2:
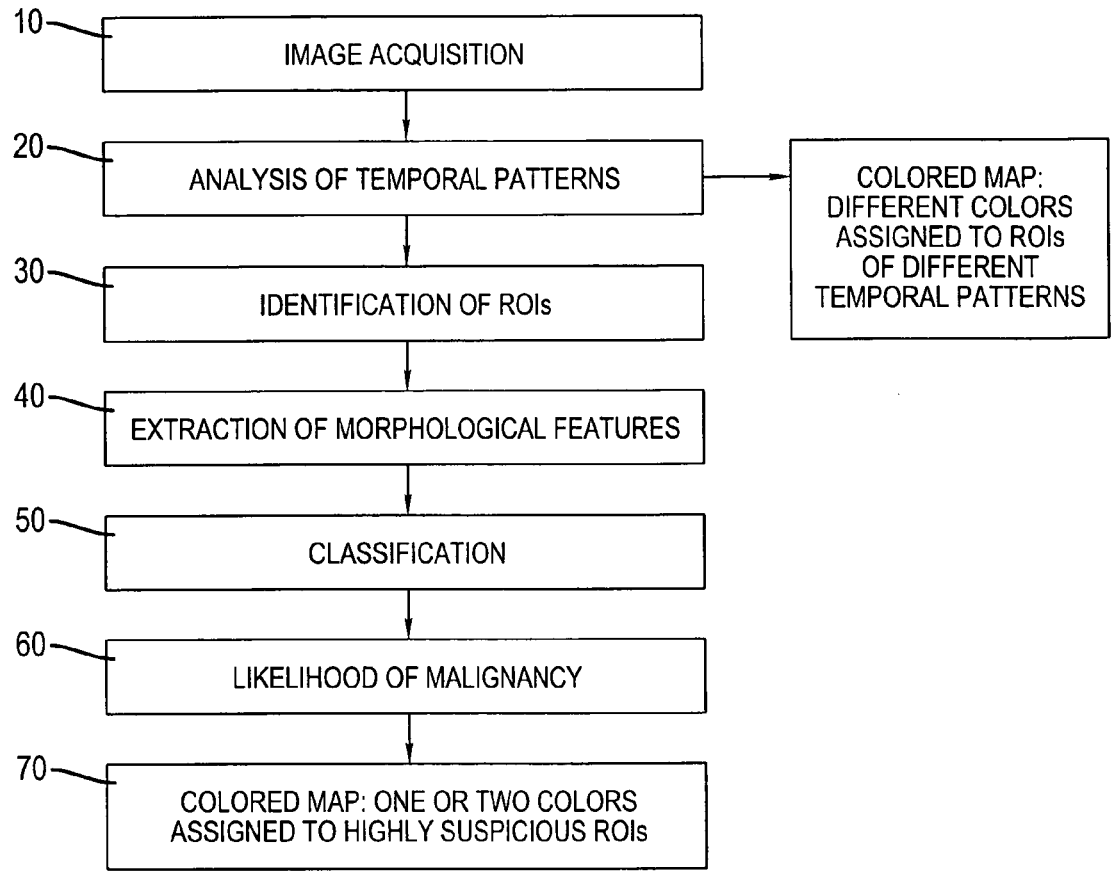
FIG. 2 is a flow chart or diagram of a method for automated detection and characterization of breast tissues in MR images in accordance with present invention.

FIG. 2 shows a flow chart or diagram generally illustrating an automated method for the detection and characterization of lesions in MR images in accordance with the present invention. Generally, 3-dimensional (3D) MR images of the same breast are acquired over a period of time (step 10). During acquisition, at least one scan is acquired prior to injection of a contrast agent (pre-contrast) and at least two scans are acquired after injection (post-contrast). As shown in FIG. 1 for illustrative, exemplary purposes, pre-contrast injection is at time $T_{-1}$; contrast injection is at time $T_0$; and three post contrasts are acquired at times $T_1$, $T_2$, $T_3$. The acquired 3D images comprise a volume (data set) and are presented in digital format.

It is noted that patient motion during the acquisition over time can occur. As such, image alignment or registration of the 3D data set(s) of the same breast acquired at different time is recommended to accurately analyze contrast-enhancement patterns of different tissue types. The alignment is particularly desired for accurate diagnosis of small-size lesions. Visual alignments of corresponding regions or cross-sections from two different 3D data sets can be difficult for a large volume of data.

An exemplary method employable to realize the alignment function is a non-rigid registration that aligns 3D data set A with set B and is well known in medical imaging and remote sensing fields. Persons skilled in the art will recognize that other registration methods can be used. The 3D images of the same breast acquired before and after the contrast injection are registered. This registration operation is performed for each corresponding cross sections acquired at different times. For the particular example described, each of three post-contrast series (times $T_1$, $T_2$, $T_3$) is preferably aligned independently with a baseline image (e.g., pre-contrast acquisition) to remove any motion artifact during the acquisition.

Figure 3:
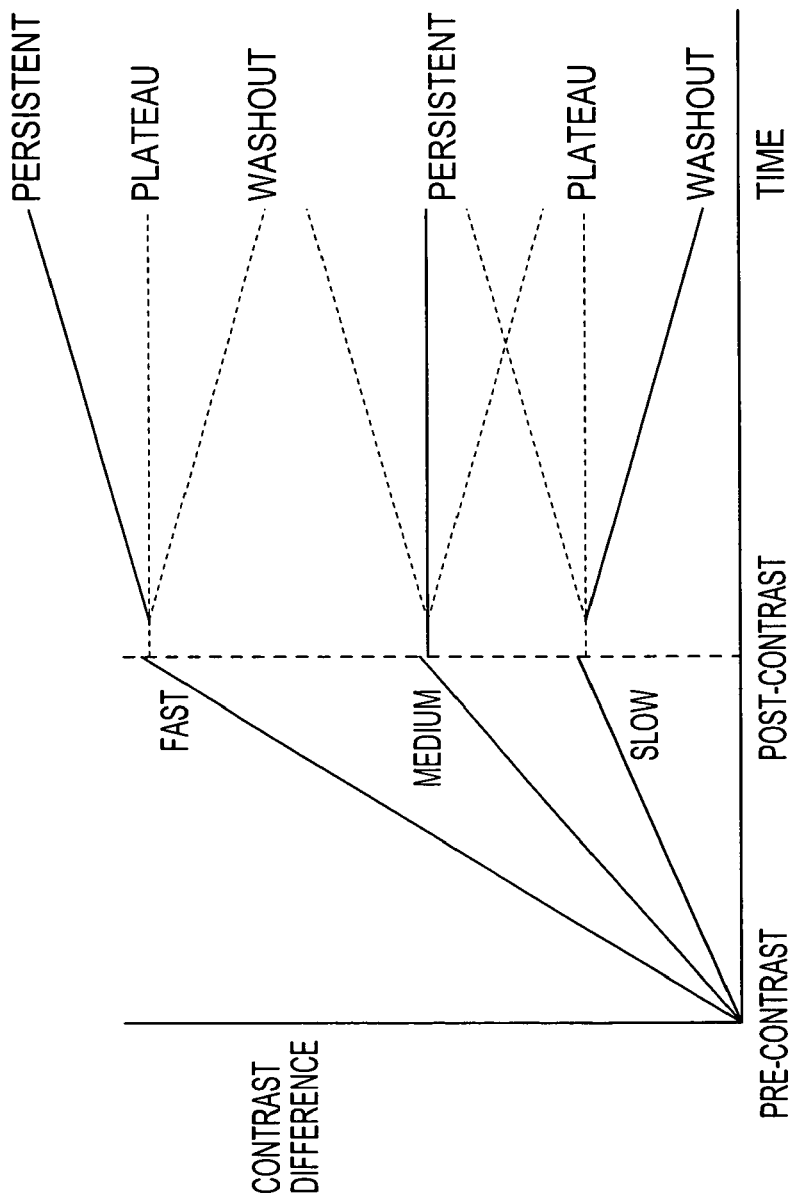
FIG. 3 illustrates potential combinations of uptake rate (e.g., slow, medium, and fast) and washout rate (e.g., persistent, plateau and washout) properties.

At step 20, an analysis of temporal patterns includes steps to identify the three types (described with reference to FIG. 1) of time/enhancement intensity curves. Benign lesions are considered to demonstrate a Type I curve and malignant lesions a Type III. Because of the overlap in enhancement patterns between benign and malignant, Applicants describe a method to further categorize breast tissues into more than three categories (for example, 9 categories), as shown in FIG. 3, which is the combination of fast, medium and slow uptake rates (the "uptake phase" occurring between pre-contrast and post-contrast) with persistent, plateau and washout rates (the "washout phase" occurring after post-contrast). The intention of finer categories is to provide better separation between benign and malignant lesions.

The time/enhancement intensity curve analysis (step 20) is more particularly described with reference to FIG. 4, wherein steps 21-27 are directed to the "uptake phase" and step 28 is directed to the "washout phase".

This analysis preferably includes an aligning step (step 21) of aligning pre-contrast data (herein, pre) with post-contrast data (herein, post 1, post 2 and post3) to identify corresponding pixels and analyzing the intensities of each pixel from the 3D images acquired at different time (post1, post2, post3) in comparison with pre.

At steps 22 and 23, a relative enhancement ($RE_n$) for each post series to the pre-contrast series is calculated as following:

$$RE_n = \frac{IM_n - pre}{pre} \quad (1)$$

wherein $IM_n$ ((n=1, 2, 3)) represents an intensity of a pixel from any of the three post series (post1, post2, post3). The pre represents the intensity of the same pixel from pre-injection. An uptake threshold is applied to the relative enhancement ($RE_n$). A relative enhancement larger than the uptake threshold indicates that the pixels present obvious contrast enhancement. These pixels (Set1 from post1, Set2 from post2, Set3 from post3) are considered to be suspicious (i.e., candidates) for further analysis.

A noise from Set1, Set2, and Set3 is then determined and removed.

Figure 4:
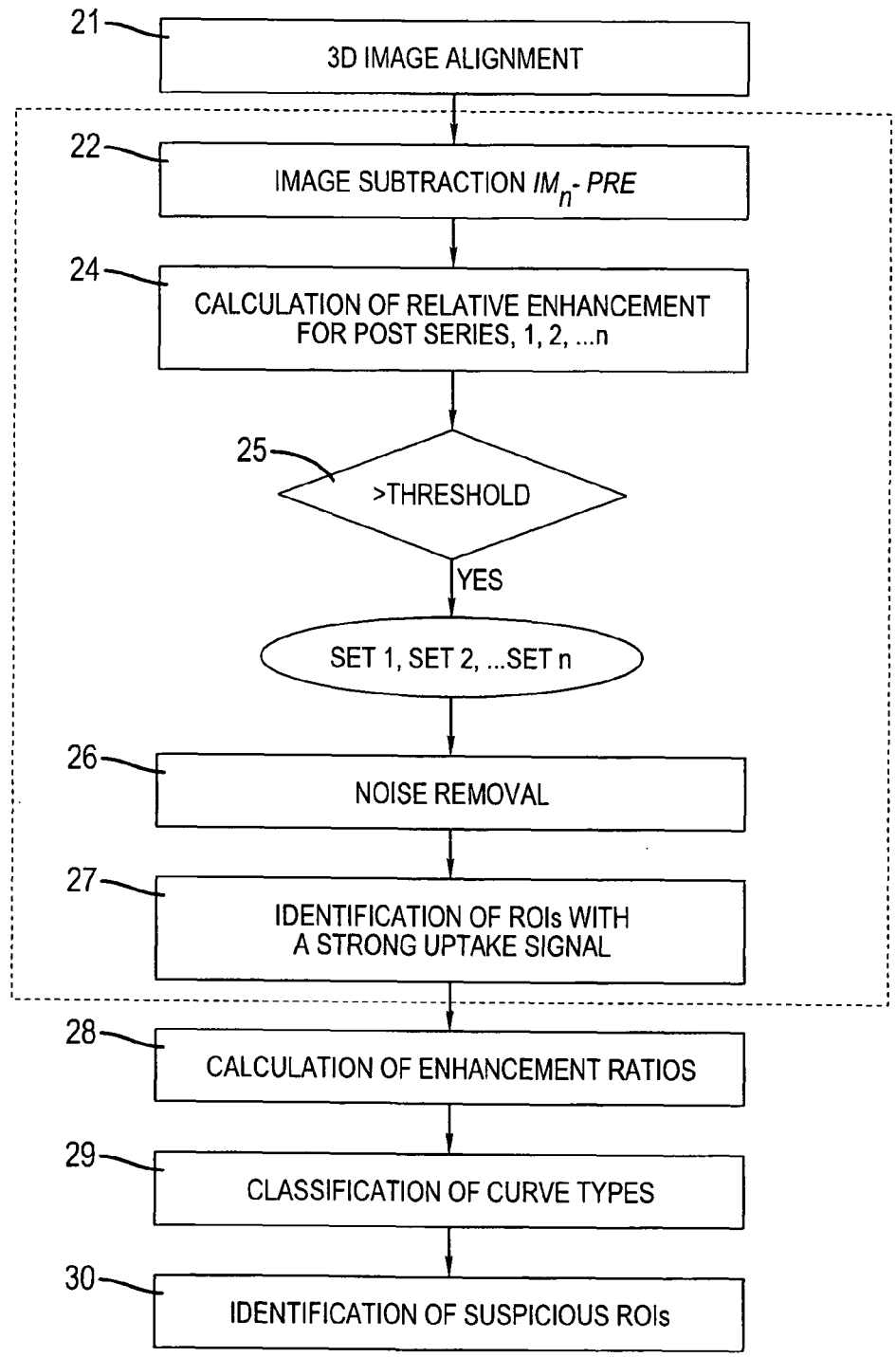
FIG. 4 is a flow chart or diagram illustrating one embodiment of the automatic abnormal tissue detection method in accordance with the present invention.

As shown in FIG. 4 at step 24, a relative enhancement is determined by calculating an average enhancement $AvgDiff_n$ and absolute enhancement $AbsDiff_n$ for the voxels in Set1, Set2 and Set3 as follows:

$$AvgDiff_n = \frac{1}{M}\sum_{i=1}^{M}(IM_n(i) - pre(i)) \quad (2)$$

$$AbsDiff_n(i) = IM_n(i) - pre(i) \quad (3)$$

wherein M is the total pixel number in $Set_n$ ((n=1, 2, 3)).

Pixels whose absolute enhancements ($AbsDiff_n$) are smaller than a threshold (for example, the average ($AvgDiff_n$, i.e. $AbsDiff_n(i) < AvgDiff_n$), are removed as noise from $Set_n$ ((n=1, 2, 3)) (step 25). $Set_n$((n=1, 2, 3)) becomes $Set'_n$((n=1, 2, 3)) after noise removal (step 26). The final suspicious/candidate pixels (PixelSet) subject for further analysis are determined by the union of $Set'_n$((n=1, 2, 3)) as calculated in Equation 4 (step 27).

$$PixelSet = Set'1 \cup Set'2 \cup Set'3 \quad (4)$$

A further calculation (step 28) is made for the enhancement ratio of one post series to another post series for each point in the PixelSet. For the particular example described, three enhancement ratios are calculated as follows:

$$ER_1 = \frac{IM_1 - pre}{IM_3 - pre}, \quad (5)$$

$$ER_2 = \frac{IM_1 - pre}{IM_2 - pre},$$

$$ER_3 = \frac{IM_2 - pre}{IM_3 - pre}$$

A determination is made of the curve type for each pixel based on the $RE_n$ and $ER_n$ (step 29). The relative enhancement $RE_n$ measures the uptake speed. The strength of the relative enhancement as an indicator for uptake speed decreases from $RE_1$, $RE_2$ to $RE_3$. The enhancement ratios $ER_n$ measure how fast the contrast agent washes out. The strength of the enhancement ratio as an indicator for the degree of washout speed decreases from $ER_2$, $ER_3$ to $ER_1$. A combination of rules/thresholds on $RE_n$ and $ER_n$ measure the speed of update and washout, which determine the curve type for each pixel in the PixelSet.

For example, the following thresholds can be arranged to categorize pixels into 9 different categories.

Criteria for classification of nine categories:

| | |
|---|---|
| 1) $RE_1 > 1.0$ & $ER_2 > 1.0$ | Fast uptake and fast washout |
| 2) $RE_1 > 1.0$ & $0.8 < ER_2 < 1.0$ | Fast uptake and plateau |
| 3) $RE_1 > 1.0$ & $ER_2 < 0.8$ | Fast uptake and persistent |
| 4) $0.6 < RE_1 < 1$ & $ER_2 > 1.0$ | Medium uptake and fast washout |
| 5) $0.6 < RE_1 < 1$ & $0.8 < ER_2 < 1.0$ | Medium uptake and plateau |
| 6) $0.6 < RE_1 < 1$ & $ER_2 < 0.8$ | Medium uptake and persistent |
| 7) $RE_1 < 0.6$ & $ER_2 > 1.0$ | Slow uptake and fast washout |
| 8) $RE_1 < 0.6$ & $0.8 < ER_2 < 1.0$ | Slow uptake and plateau |
| 9) $RE_1 < 0.6$ & $ER_2 < 0.8$ | Slow uptake and persistent |

For example, a high value of $ER_1$ and a high value of $RE_2$ can indicate a fast uptake and fast washout curve (Category 1). Voxels with such a property of curve type are identified as highly suspicious for malignancy. Each category can be assigned a likelihood of malignancy. A threshold on the likelihood of malignancy can be applied to determine the regions in PixelSet that are suspicious enough for further analysis. For example, a combination of thresholds can be set (for example, $RE_1>1$ & $RE_3<RE_2$ and $ER_1>1.2$ & $ER_2>1.0$) to determine suspicious pixels for further analysis. The criteria set on these values can be relatively relaxed to allow more suspicious areas to pass on to the next step for further analysis using spatial features and/or temporal features. As such, at step 30, suspicious ROIs (regions of interest) are identified.

It is noted that the $ER_n$ and $RE_n$ from each pixel can be analyzed by a trained classifier and a number can be outputed/provided indicating a likelihood of malignancy. Pixels can then classified into several categories, for example, two categories; one for normal and one for cancer.

Further noise can be removed based on area size criteria. For example, a suspicious pixel is labeled if it connects to other pixels and in a group of connected pixels which constitutes a region of a size larger than a pre-selected size-criteria. In one particular arrangement, the size threshold is set at 5 pixels for an individual sagittal cross section.

As shown in FIG. 2, a map with a different color for each of the 9 categories, or a map with single color (e.g., red) for areas that are considered to be suspicious enough can be displayed for visualization.

Figure 5A:
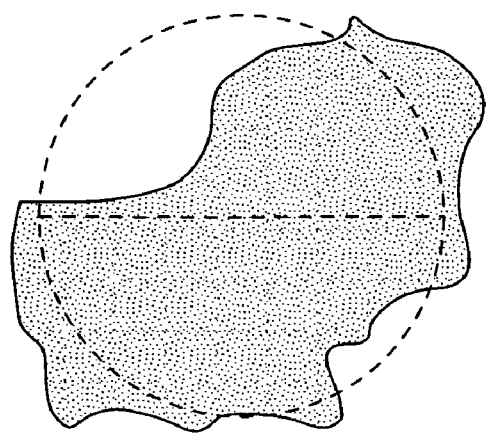
FIGS. 5A and 5B respectively illustrate the effective circle for circulation calculation and the inner and outer regions of the segmented area for the calculation of margin enhancement.
Figure 5B:
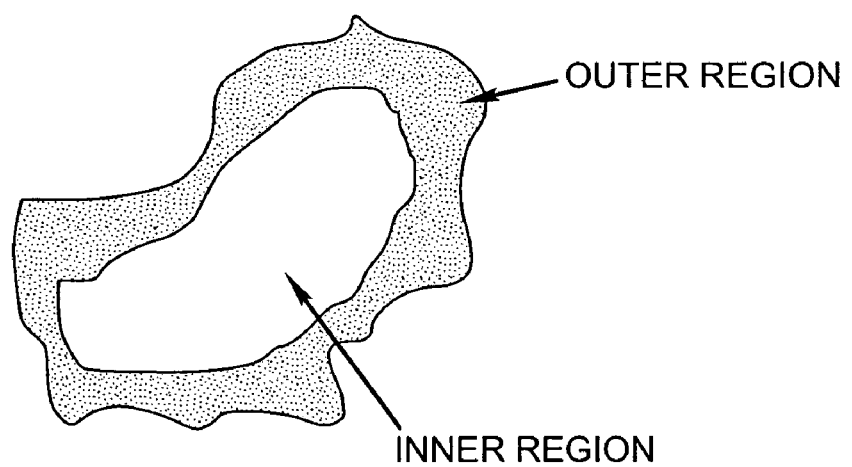

Referring again to FIG. 2, after the suspicious areas are identified from time/enhancement curves, various morphological features can be extracted from these identified suspicious areas (step 40). The morphological features may include size, circularity, gradient-based features extracted from the post-contrast series, variation in gray level within the lesion, ratio (margin enhancement ratio) of the mean gray level within the predefined inner region to the mean gray level within the predefined outer region of the suspicious area (FIG. 5B).

A size is calculated in terms of the total number of pixels in two dimensional space or the total number of voxels in 3D. A circularity is defined, shown in FIG. 5A, as the ratio of the area/volume of an identified suspicious region within the effective circle/sphere to the area of the identified suspicious region. The inner region of the suspicious area can be obtained by performing erosion operation to erode away the boundary regions of the suspicious area (FIG. 5B). A margin enhancement ratio can be calculated from images obtained by subtracting the pre-contrast series from the post-contrast series or by subtracting a post-contrast series from another post-contrast series. The margin enhancement and the variation in gray level within the lesion are used to measure the nonuniformity of contrast uptake.

The gradient-based features such as radial gradients can be used to characterize the margin and shape of identified suspicious areas. In a radial edge-gradient analysis, the maximum gradient at each pixel location of a particular neighborhood is calculated with a 5×5 Sobel filter and the angle of this gradient relative to its radial direction is determined.

Figure 6:
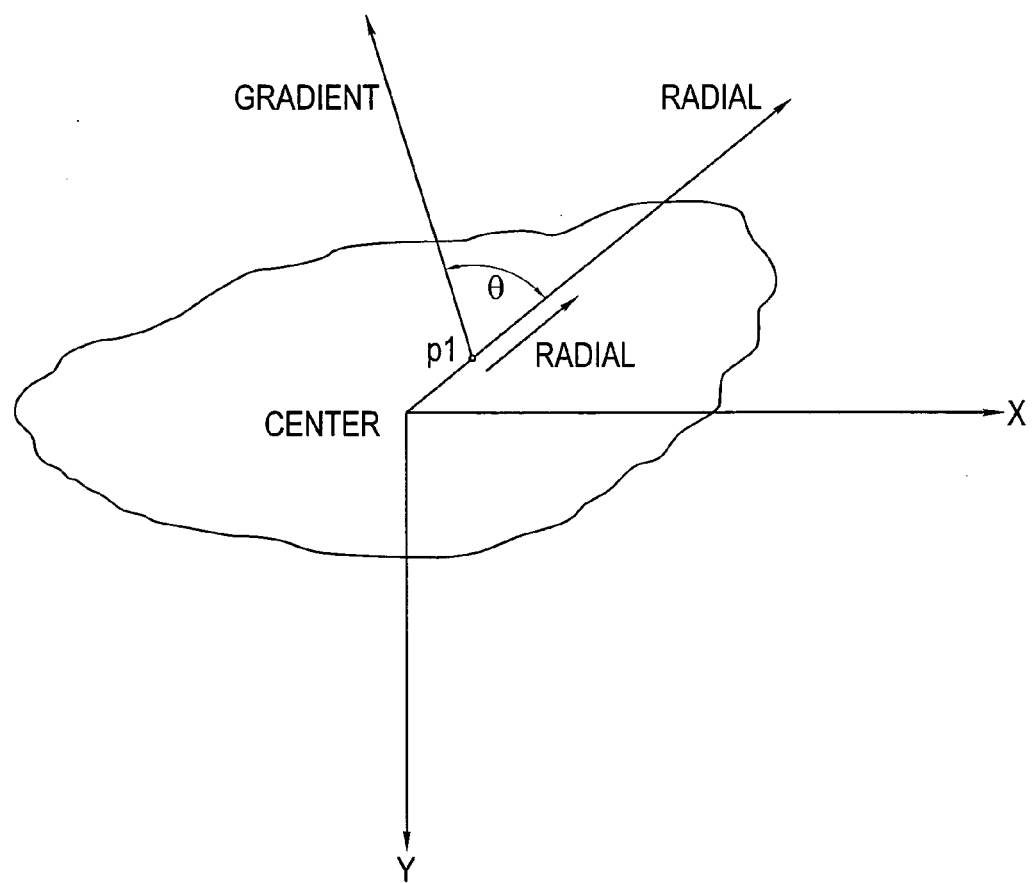
FIG. 6 provides a diagrammatic view illustrating the concept of radial gradient.
Figure 7A:
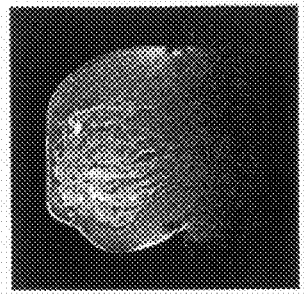
FIGS. 7A-7J show a cross-sections of a sagittal view of the breast a) pre-contrast enhancement at time $T_{-1}$, b) post contrast at time $T_1$, c) post contrast at time $T_2$, d) post contrast at time $T_3$, e-g) subtracted image by subtracting pre contrast image from post contrast images, h) the image with detected suspicious areas, i) the color map with 9 different colors indicating different types of curves, j) the color map with one color to indicate the most suspicious areas for malignancy.
Figure 7B:
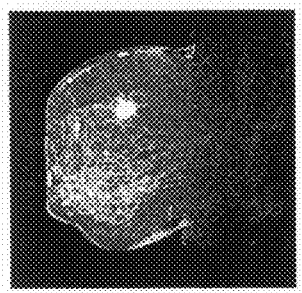
Figure 7C:
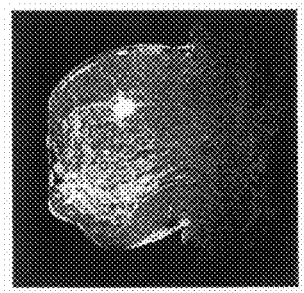
Figure 7D:
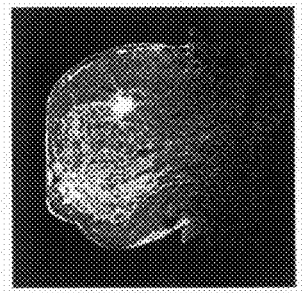
Figure 7E:
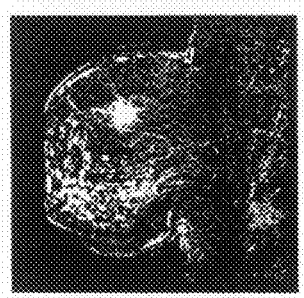
Figure 7F:
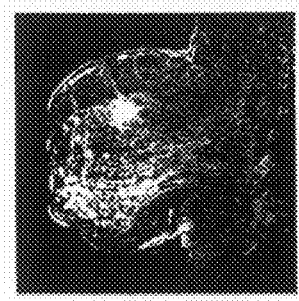
Figure 7G:
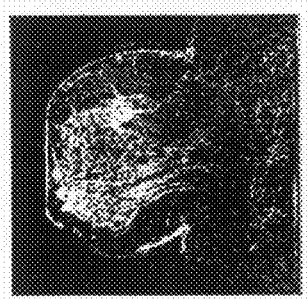
Figure 7H:
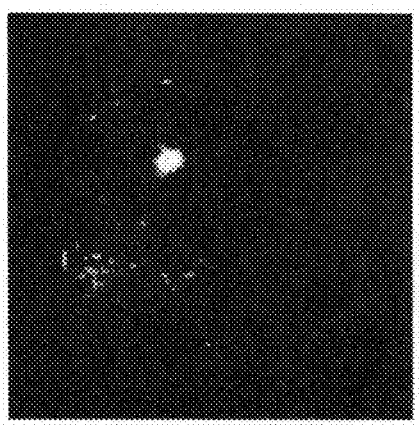
Figure 7I:
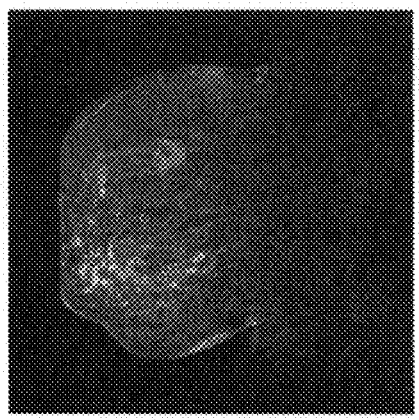
Figure 7J:
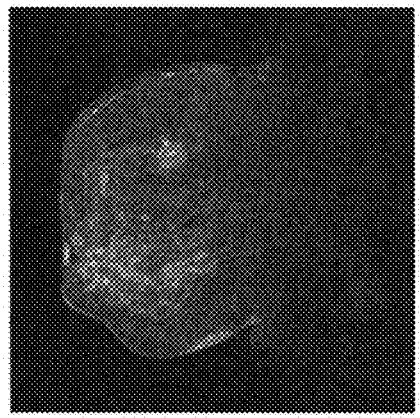

FIG. 6 illustrates a definition of this angle relative to the radial direction, which is referred to as "radial angle". The radial direction for point p1 is the direction pointing from the geometric center of the grown mass to p1. The angle $\Theta$ between the direction of the maximum gradient at the pixel p1 and its radial direction is the angle relative to the radial direction or the "radial angle". Note that $\Theta$ is not the angle the maximum gradient makes with the x-direction. Radial edge-gradient analysis that can be used to quantify the degree of spiculation is the "normalized radial gradient". A radial gradient at a pixel (p1) is defined as the projection of the maximum gradient at the pixel (p1) along its radial direction. A normalized radial gradient for an entire neighborhood is the summation of the radial gradients from the pixels in the neighborhood divided by the summation of the magnitude of the maximum gradients from all the pixels in the same neighborhood:

$$\left(\sum_{i=1}^{N} |G_i \cos\theta_i|\right) / \sum_{i=1}^{N} G_i, \tag{6}$$

wherein $\theta_i$ is the radial angle at pixel i, $G_i$ is the magnitude of the maximum gradient at pixel i and N is the total number of pixels in the neighborhood. The value of the normalized radial gradient is between zero and unity, with a value of 1.0 corresponding to a round mass. Generally, smooth and well-defined lesions have larger values of normalized radial gradient than spiculated lesions, since the maximum gradients along the margin of a smooth lesion typically have larger projections along the radial direction than a spiculated lesion.

The gradient analysis can be applied to the segmented lesion or neighborhoods around the segmented lesion to obtain the margin features. The neighborhoods are: A) the pixels within the segmented region, B) along the extracted margin (one pixel in width) of the segmented region, and C) within a rectangular segment containing the segmented region. The selection of the rectangular segment should be suitable to capture the margin information that may not be captured by the segmented lesion.

The morphological features can be merged using a classifier trained with a set of data with a known diagnosis of malignancy (step 50). The morphological features can also be merged along with at least one of the features from the time/enhancement curve analysis.

Classifiers are well known, and there are known types of classifiers suitable for medical imaging. An exemplary classifier is an SVM (support vector machine) (refer to "A Tutorial on Support Vector Machines for Pattern Recognition", by C. Burges, *Data Mining and Knowledge Discovery*, 2(2), 1-47, 1998, Kluwer Academic Publisher, Boston, with information available at the website: http://aya.technion.ac.il/karniel/CMCC/SVM-tutorial.pdf). Another exemplary classifier is an artificial neural network (refer to "Neural Networks: A Comprehensive Foundation" by Haykin S., New York, Macmillan College Publishing Company, 1994.)

From the classification step, the likelihood of the lesion being malignant can be determined (step 60). A chart or map or other visual display can be presented providing some indication of candidate regions of interest (step 70). For example, different colors can be employed to indicate various levels candidate ROIs.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

All documents, patents, journal articles and other materials cited in the present application are hereby incorporated by reference.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method for detecting and analyzing candidate lesions in a plurality of digital magnetic resonance images of a breast, the plurality of digital magnetic resonance images including both a pre-contrast image and a post-contrast plurality of temporal images, the method comprising using a computer to perform steps of:

accessing the pre-contrast image and the post-contrast a plurality of temporal images;

identifying candidate lesions by performing a pixel by pixel temporal pattern analysis of the pre-contrast image and the post-contrast plurality of temporal images to produce temporal patterns based on a plurality of categories of uptake rate of a contrast agent in an uptake phase and a plurality of categories of washout rate of the contrast agent in a washout phase; the identifying step includes steps of:

calculating a relative enhancement for each post-contrast temporal image, applying an uptake threshold to each relative enhancement to identify suspect regions determining the candidate lesions from the suspect regions determining a curve type for each candidate lesion using the relative enhancement in the uptake phase and an enhancement ratio in the washout phase, wherein the curve type are predefined combinations of an uptake rate and the plurality of categories of washout rate; and classifying the candidate lesions based on temporal patterns to produce classified candidate lesions.

2. The method of claim 1 further comprising a step of: classifying each candidate lesion into one of nine categories based on the curve type.

3. The method of claim 1, further comprising a step of: displaying at least some of the classified candidate lesions on a display.

4. The method of claim 1, further comprising a step of: generating a color map representative of the temporal patterns.

5. The method of claim 1, further comprising a step of: generating a color map representative of the candidate lesions.

6. The method of claim 1, further comprising a step of: prior to identifying the candidate lesions, registering the plurality of temporal images.

7. The method of claim 1, further comprising a step of: determining a likelihood of the candidate lesion being an actual abnormality based on the output of the classifying step.

8. A method for detecting and analyzing candidate lesions in a plurality of digital magnetic resonance images of a breast, the plurality of digital magnetic resonance images including both a pre-contrast image and a post-contrast plurality of temporal images, the method comprising using a computer to perform steps of:

accessing the pre-contrast image and the post-contrast plurality of temporal images, identifying candidate lesions by performing a pixel by pixel temporal pattern analysis of the pre-contrast image and the post-contrast plurality of temporal images to produce temporal patterns based on a plurality of categories of uptake rate of a contrast agent in an uptake phase and a plurality of categories of washout rate of the contrast agent in a washout phase, the identifying step including steps of:

calculating a relative enhancement for each post-contrast temporal image;

applying an uptake threshold to each relative enhancement to identify suspect regions;

determining the candidate lesions from the suspect regions; and determining a curve type for each candidate lesion using the relative enhancement in the uptake phase and an enhancement ratio in the washout phase, wherein the curve types are predefined combinations of an uptake rate and a washout rate from the plurality of categories of uptake rate and the plurality of categories of washout rate;

classifying the candidate lesions using the temporal patterns to produce classified candidate lesions; and generating a color map representative of the classified candidate lesions.

9. The method of claim 8, further comprising steps of: classifying each candidate lesion into one of nine categories based on the curve type; and generating a color map representative of the curve type.

10. The method of claim 8, further comprising steps of: classifying each classified candidate lesion into one of nine categories based on the curve type; and generating a color map representative of the curve type.

11. A method according to claim 1, further comprising steps of:

performing a morphological operation on the candidate lesions to produce morphological features; and further classifying the candidate lesions using the morphological features.

12. A method according to claim 1, wherein the step of determining the candidate lesions comprises calculating an average enhancement and an absolute enhancement of the suspect lesions.

13. A method according to claim 8, further comprising steps of:

performing a morphological operation on the candidate lesions to produce morphological features; and further classifying the candidate lesions using the morphological features.

14. A method according to claim 8, wherein the step of determining the candidate lesions comprises calculating an average enhancement and an absolute enhancement of the suspect lesions.

15. The method of claim 8, further comprising a step of: prior to identifying the candidate lesions, registering the plurality of temporal images.

* * * * *